United States Patent
Colln et al.

[11] 3,901,956
[45] Aug. 26, 1975

[54] DICHLOROVINYL THIONOPHOSPHORIC ACID DIESTER AMIDES

[75] Inventors: Reimer Colln, Wuppertal; Wilhelm Sirrenberg, Sprockhovel; Wolfgang Behrenz, Cologne; Ingeborg Hammann, Cologne, all of Germany

[73] Assignee: Bayer Aktiengesellschaft, Leverkusen, Germany

[22] Filed: Jan. 17, 1973

[21] Appl. No.: 324,254

[30] Foreign Application Priority Data
Jan. 21, 1972 Germany............ 2202855

[52] U.S. Cl. .............. 260/957; 260/950; 424/217; 424/219
[51] Int. Cl. .................. A01n 9/36; C07f 9/24
[58] Field of Search .............. 260/951, 950

[56] References Cited
UNITED STATES PATENTS
3,264,184  8/1966  Geiger et al. .......... 260/950 X
3,652,742  3/1972  Sirrenberg et al. ......... 260/957
3,745,198  7/1973  Soloway et al. ............ 260/957

*Primary Examiner*—Lorraine A. Weinberger
*Assistant Examiner*—Richard L. Raymond
*Attorney, Agent, or Firm*—Burgess, Dinklage & Sprung

[57] ABSTRACT

Dichlorovinylthionophosphoric acid diester amides of the formula

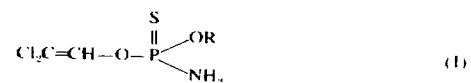

in which
R is alkyl of one to eight carbon atoms or lower alkoxy-lower alkyl,
which possess insecticidal, acaricidal and fungicidal properties.

8 Claims, No Drawings

DICHLOROVINYL THIONOPHOSPHORIC ACID DIESTER AMIDES

The present invention relates to and has for its objects the provision of particular new dichlorovinylthionophosphoric acid diester amides, i.e., O-(lower alkyl or lower alkoxy-lower alkyl)-N-(unsubstituted)-dichlorovinylthionophosphoric acid diester amides, which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g. insects, acarids and fungi, especially insects and acarids, with other and further objects becoming apparent from a study of the within specification and accompanying examples.

It is known from published Dutch Patent Application 6,806,396 that O-alkyl-O-(2,2-dichlorovinyl)-phosphoric acid diester amides, such as O-n-propyl-(Compound A) or O-isopropyl-O-(2,2-dichlorovinyl)-phosphoric acid diester amide (Compound B), possess insecticidal and acaricidal activity.

The present invention provides dichlorovinylthionophosphoric acid diester amides of the general formula

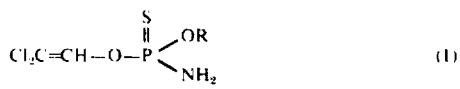

in which

R is alkyl of one to eight carbon atoms or lower alkoxy-lower alkyl.

R is preferably straight or branched alkyl of one to seven carbon atoms, especially lower alkyl, or alkoxyalkyl with one to four, especially one to three carbon atoms in each of the alkyl and alkoxy moieties.

Surprisingly, the dichlorovinylthionophosphoric acid diester amides according to the invention are distinguished by a considerably better insecticidal, acaricidal and, in some cases, fungicidal, activity than the known compounds of analogous constitution and of the same direction of activity. The substances according to the invention therefore represent a genuine enrichment of the art.

Moreover, the compounds according to the invention contribute to the satisfaction of the ever-increasing demand for new active compounds in the field of pesticides, with a view especially to improvements in the protection of the environment, which renders desirable compounds with low toxicity to warm-blooded animals and low phytotixicity, more rapid degradation in and on the plant in short time intervals to be observed between spraying with pesticide and harvesting, effectiveness against resistant pests, etc.

In addition, the novel compounds are characterized by activity against Rhopalosiphum, Myzus and Tetranychus which is markedly superior to that of their N-methyl counterparts which are disclosed and claimed in U.S. Pat. application Ser. No. 267,759, filed June 30, 1972, now pending.

The invention also provides a process for the production of a dichlorovinylthionophosphoric acid diester amide of the formula (I) in which a dichlorovinylthionophosphoric acid ester diamide of the formula

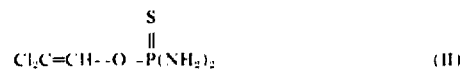

is reacted with a hydroxy compound of the general formula

HOR            (III)

in which
R has the meaning stated above
and hydrogen chloride is supplied to the reaction mixture. An equivalent amount of hydrogen chloride is naturally normally used.

If O-(2,2-dichlorovinyl)-thionophosphoric acid ester diamide and n-butanol are used as starting materials, the reaction course can be represented by the following formula scheme:

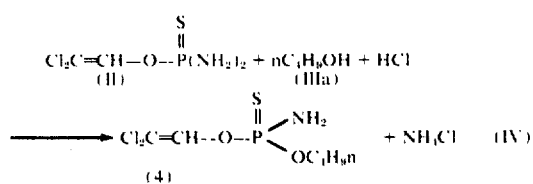

As examples of hydroxy compounds to be used in the process, there are mentioned in particular: methanol, ethanol, n- or iso-propanol, n-, sec.-, iso- or tert.-butanol, n-, iso- or neo-pentanol, n-hexanol, n-heptanol, n-octanol, 2-ethyl-butanol, 2,2-dimethylbutanol, 2-ethylhexanol, 2,2-dimethylhexanol, and methyl-, ethyl-, or propylglycol.

The hydroxy compounds (III) and the O-(2,2-dichlorovinyl)-thionophosphoric acid ester diamide (II) required as starting materials are known from the literature and are readily available on an industrial scale.

The process of the invention is preferably carried out in the presence of a suitable solvent or diluent. For this purpose there may be used an excess of the hydroxy compound, but inert organic solvents are also suitable. Preferred examples include ethers, such as diethyl or dibutyl ether and dioxane; carboxylic acid esters, such as methyl or ethyl acetate; and nitriles, such as acetonitrile and propionitrile.

The reaction temperature can be varied within a fairly wide range. In general, the reaction is carried out at about 20° to 120°, preferably at 40° to 70°C.

The reaction is, in general, carried out at normal pressure.

The reaction is expediently effected by forming a solution of the O-(2,2-dichlorovinyl)-thionophosphoric acid ester diamide, together with the hydroxy compound (III) concerned, in a suitable solvent of diluent, preferably an excess of the hydroxy compound, and adding to this solution, with external cooling, the equivalent amount of hydrogen chloride (preferably by introduction of gaseous hydrogen chloride). After the mixture has been stirred for one to several hours at the temperatures stated, it may be cooled, rendered alkaline with a little gaseous ammonia, and clarified by addition of activated charcoal. The further working up of the mixture may take place in known manner by filtration of the undissolved components, evaporation of the solvent from the filtrate, renewed dissolving of the residue in an organic solvent, washing, drying and renewed evaporation of the solvent, preferably under reduced pressure.

The substances according to the invention are obtained in most cases in the form of oils which sometimes cannot be distilled without decomposition but can, by so-called "slight distillation" (that is, by longer heating at moderately elevated temperature under reduced pressure), be freed from the last volatile components and in this way can be purified. For their characterization, the refractive index and/or boiling point may be used.

The new dichlorovinylthionophosphoric acid diester amides are distinguished by an outstanding insecticidal (including also soil-insecticidal) and acaricidal effectiveness against crop pests, hygiene pests and pests of stored products, as well as ectoparasites. They possess a good activity against both sucking and eating insects, and mites (Acarina). At the same time they exhibit a low phytotoxicity and, in some cases, a fungicidal effect. The products according to the invention are therefore suitable for use as pesticides, preferably in crop protection and the protection of stored products, as well as in the hygiene and veterinary field.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotethix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*), cockroaches, such as the German cockroach (*Blattella germanica*), American cockroach (*Periplaneta americana*), madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesiteus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) these are classed, in particular, the spider mites (Tetranychidae such as the two-spotted spider mite (*Tetranychus urticae*) and the European red mite ((*Paratetranychus pilosus* = *Panonychus ulmi*), gall mites, for example the black current gall mite (*Eriophyes ribis*) and tarsonemides, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, quartz silica, chalk, i.e., calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and fungicides, or rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e., by applying such compound is normally a liquid, or by applying a liquid composition containing the same, via very effective atomizing equipment, in finely divided form, e.g. average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and fungi, and more particularly methods of combating at least one of insects and acarids, which comprises applying to at least one of correspondingly (a) such insects, (b) such acarids, (c) such fungi, and (d) the corresponding habitat thereof, i.e., the locus to be protected, a correspondingly combative or toxic amount, i.e., an insecticidally, acaricidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding acitivty of the particular new compounds of the present invention are illustrated, without limitation, by the following examples:

EXAMPLE 1 — $LT_{100}$ test for Diptera

Test insects: *Musca domestica*
Solvent: acetone 2 parts by weight of active compound were dissolved in 1000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it was covered with a glass lid.

The condition of the test insects was continuously observed. The time which was necessary for a 100% knock down effect was determined.

The test insects the active compounds, the concentrations of the active compounds and the periods of time at which there is a 100% knock down effect can be seen from the following Table 1.

Table 1

(LT$_{100}$ test for Diptera / Musca domestica)

| Active compounds | | Concentration of active compound of the solution in % by weight | LT$_{100}$ |
|---|---|---|---|
| $CH_3-CH_2-CH_2-O$<br>$H_2N$ >P(=O)-O-CH=CCl$_2$<br>(known) | (A) | 0.2<br>0.02 | 80'<br>8h=90 % |
| $(CH_3)_2-CH-O$<br>$H_2N$ >P(=O)-O-CH=CCl$_2$<br>(known) | (B) | 0.2<br>0.02<br>0.002 | 40'<br>125'<br>8h=100 % |
| $CH_3O$<br>$H_2N$ >P(=S)-OCH=CCl$_2$ | (1) | 0.2<br>0.02<br>0.002<br>0.0002 | 15'<br>30'<br>95'<br>270' |
| $C_2H_5O$<br>$H_2N$ >P(=S)-OCH=CCl$_2$ | (2) | 0.2<br>0.02<br>0.002<br>0.0002<br>0.00002 | 15'<br>35'<br>90'<br>8h<br>8h=90 % |
| $n-C_3H_7-O$<br>$H_2N$ >P(=S)-O-CH=CCl$_2$ | (3) | 0.2<br>0.02<br>0.002<br>0.0002 | 20'<br>40'<br>130'<br>190' |
| $i-C_3H_7O$<br>$H_2N$ >P(=S)-OCH=CCl$_2$ | (6) | 0.2<br>0.02<br>0.002 | 20'<br>50'<br>180' |
| $i-C_4H_9O$<br>$H_2N$ >P(=S)-OCH=CCl$_2$ | (5) | 0.2<br>0.02<br>0.002 | 25'<br>75'<br>240' |

EXAMPLE 2 — LT$_{100}$ test

Test insects: *Aedes aegypti*
Solvent: acetone 2 parts by weight of active compound were dissolved in 1000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per square meter of filter paper varied with the concentrations of the solution of active compound used. About 25 test insects were then placed in the Petri dish and it was covered with a glass lid.

The condition of the test insects was continuously observed. The time which was necessary for a 100% destruction was determined.

The test insects the active compounds, the concentrations of the active compounds and the periods of time at which there is a 100% destruction can be seen from the following Table 2.

Table 2

(LT$_{100}$ test for Diptera / Aedes aegypti)

| Active compounds | | Concentration of active compound of the solution in % by weight | LT$_{100}$ |
|---|---|---|---|
| $CH_3-CH_2-CH_2-O$<br>$H_2N$ >P(=O)-O-CH=CCl$_2$<br>(known) | (A) | 0.2<br>0.02<br>0.002 | 60'<br>120'<br>3h=90% |
| $CH_3O$<br>$H_2N$ >P(=S)-OCH=CCl$_2$ | (1) | 0.2<br>0.02<br>0.002 | 60'<br>60'<br>180' |
| $C_2H_5O$<br>$H_2N$ >P(=S)-O-CH=CCl$_2$ | (2) | 0.2<br>0.02<br>0.002 | 60'<br>60'<br>120' |
| $n-C_3H_7O$<br>$H_2N$ >P(=S)-O-CH=CCl$_2$ | (3) | 0.2<br>0.02<br>0.002 | 60'<br>60'<br>120' |
| $i-C_3H_7O$<br>$H_2N$ >P(=S)-O-CH=CCl$_2$ | (6) | 0.2<br>0.02<br>0.002 | 60'<br>60'<br>180' |
| $n-C_4H_9O$<br>$H_2N$ >P(=S)-O-CH=CCl$_2$ | (4) | 0.2<br>0.02<br>0.002 | 60'<br>60'<br>120' |
| $i-C_4H_9-O$<br>$H_2N$ >P(=S)-O-CH=CCl$_2$ | (5) | 0.2<br>0.02<br>0.002 | 60'<br>120'<br>180' |

EXAMPLE 3 — LD test

Test insects: *Periplaneta americana*
Solvent: acetone 2 parts by weight of the active compound were dissolved in 1000 parts by volume of the solvent. The solution so obtained was diluted with further solvent to the desired concentration.

2.5 ml of the solution of the active compound were pipetted into a Petri dish. On the bottom of the Petri dish there was a filter paper with a diameter of about 9.5 cm. The Petri dish remained uncovered until the solvent had completely evaporated. The amount of active compound per square meter of filter paper varied with the concentration of the solution of active compound used. About 10 test insects were then placed in the Petri dish and it was covered with a glass lid.

The condition of the test insects was observed 3 days after the commencement of the experiments. The destruction was determined as a percentage.

The active compounds, the concentrations of the active compounds, the test insects and the results can be seen from the following Table 3.

Table 3

| Active compounds | (LD test / Periplaneta americana) | Concentration of active compound of the solution in % by weight | Degree of destruction in % |
|---|---|---|---|
| $CH_3-CH_2-CH_2-O$<br>$H_2N$ $>P-O-CH=CCl_2$<br>(known) | (A) | 0.2 | 0 |
| $CH_3O$<br>$H_2N$ $>P(=S)-O-CH=CCl_2$ | (1) | 0.2<br>0.02 | 100<br>100 |
| $C_2H_5O$<br>$H_2N$ $>P(=S)-O-CH=CCl_2$ | (2) | 0.2<br>0.02 | 100<br>100 |
| $n-C_3H_7O$<br>$H_2N$ $>P(=S)-O-CH=CCl_2$ | (3) | 0.2 | 100 |
| $i-C_3H_7O$<br>$H_2N$ $>P(=S)-O-CH=CCl_2$ | (6) | 0.2<br>0.02 | 100<br>100 |
| $n-C_4H_9O$<br>$H_2N$ $>P(=S)-O-CH=CCl_2$ | (4) | 0.2 | 100 |
| $i-C_4H_9O$<br>$H_2N$ $>P(=S)-O-CH=CCl_2$ | (5) | 0.2 | 100 |

EXAMPLE 4 — LD

Test insects: *Sitophilus granarius*
Solvent: acetone 2 parts by weight of the active compound were dissolved in 1000 parts by volume of the solvent. The solution so obtained was diluted with further solvent to the desired concentration.

2.5 ml of the solution of the active compound were pipetted into a Petri dish. On the bottom of the Petri dish there was a filter paper with a diameter of about 9.5 cm. The Petri dish remained uncovered until the solvent had completely evaporated. The amount of active compound per square meter of filter paper varied with the concentration of the solution of active compound used. About 25 test insects were then placed in the Petri dish and it was covered with a glass lid.

The condition of the test insects was observed 3 days after the commencement of the experiments. The destruction was determined as a percentage.

The active compounds, the concentrations of the active compounds, the test insects and the results can be seen from the following Table 4.

Table 4

| Active compounds | (LD test / Sitophilus granarius) | Concentration of active compound of the solution in % by weight | Degree of destruction in % |
|---|---|---|---|
| $CH_3-CH_2-CH_2-O$<br>$H_2N$ $>P(=O)-O-CH=CCl_2$<br>(known) | (A) | 0.2 | 100 |
| $CH_3O$<br>$H_2N$ $>P(=S)-O-CH=CCl_2$ | (1) | 0.2<br>0.02<br>0.002 | 100<br>100<br>100 |
| $C_2H_5O$<br>$H_2N$ $>P(=S)-O-CH=CCl_2$ | (2) | 0.2<br>0.02<br>0.002 | 100<br>100<br>40 |
| $n-C_3H_7O$<br>$H_2N$ $>P(=S)-O-CH=CCl_2$ | (3) | 0.2<br>0.02<br>0.002 | 100<br>100<br>100 |
| $i-C_3H_7O$<br>$H_2N$ $>P(=S)-OCH=CCl_2$ | (6) | 0.2<br>0.02<br>0.002 | 100<br>100<br>70 |
| $n-C_4H_9O$<br>$H_2N$ $>P(=S)-O-CH=CCl_2$ | (4) | 0.2<br>0.02<br>0.002 | 100<br>100<br>100 |

EXAMPLE 5 — Phaedon larvae test

Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier, and the concentrate was diluted with water to the desired concentration.

Cabbage leaves (*Brassica oleracea*) were sprayed with the preparation of the active compound until dripping wet and were then infected with mustard beetle larvae (*Phaedon cochleariae*).

After the specified periods of time, the degree of destruction was determined as a percentage: 100% means that all the beetle larvae were killed. 0% means that none of the beetle larvae were killed.

The active compounds, the concentration of the active compounds, the times of evaluation and the results can be seen from the following Table 5.

Table 5

| Active compounds | (Phaedon larvae test) | Concentration of active compound in % by weight | Degree of destruction in % after 3 days |
|---|---|---|---|
| $CH_3-CH_2-CH_2-O$<br>$H_2N$ $>P(=O)-O-CH=CCl_2$<br>(known) | (A) | 0.1<br>0.01 | 100<br>0 |
| $CH_3O$<br>$H_2N$ $>P(=S)-O-CH=CCl_2$ | (1) | 0.1<br>0.01<br>0.001 | 100<br>100<br>30 |
| $C_2H_5O$<br>$H_2N$ $>P(=S)-O-CH=CCl_2$ | (2) | 0.1<br>0.01 | 100<br>100 |
| $n-C_3H_7O$<br>$H_2N$ $>P(=S)-O-CH=CCl_2$ | (3) | 0.1<br>0.01 | 100<br>100 |
| $i-C_3H_7O$<br>$H_2N$ $>P(=S)-O-CH=CCl_2$ | (6) | 0.1<br>0.01<br>0.001 | 100<br>100<br>40 |

Table 5-continued

| Active compounds | (Phaedon larvae test) | Concentration of active compound in % by weight | Degree of destruction in % after 3 days |
|---|---|---|---|
| n-C₃H₇O\\P—O—CH=CCl₂ / H₂N (S) | (4) | 0.1 / 0.01 | 100 / 100 |
| i-C₄H₉O\\P—O—CH=CCl₂ / H₂N (S) | (5) | 0.1 / 0.01 | 100 / 100 |

EXAMPLE 6 — Myzus test (contact action)

Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 6.

Table 6

| Active compounds | (Myzus test / contact action) | Concentration of active compound in % by weight | Degree of destruction in % after 1 day |
|---|---|---|---|
| CH₃—CH₂—CH₂—O\\P—O—CH=CCl₂ / H₂N (O) (known) | (A) | 0.1 / 0.01 | 100 / 40 |
| CH₃O\\P—O—CH=CCl₂ / H₂N (S) | (1) | 0.1 / 0.01 / 0.001 | 100 / 100 / 100 |
| C₂H₅O\\P—O—CH=CCl₂ / H₂N (S) | (2) | 0.1 / 0.01 / 0.001 | 100 / 100 / 98 |
| n-C₃H₇O\\P—O—CH=CCl₂ / H₂N (S) | (3) | 0.1 / 0.01 / 0.001 | 100 / 100 / 60 |
| i-C₃H₇O\\P—O—CH=CCl₂ / H₂N (S) | (6) | 0.1 / 0.01 / 0.001 | 100 / 100 / 95 |
| n-C₄H₉O\\P—O—CH=CCl₂ / H₂N (S) | (4) | 0.1 / 0.01 / 0.001 | 100 / 100 / 60 |
| i-C₄H₉O\\P—O—CH=CCl₂ / H₂N (S) | (5) | 0.1 / 0.01 / 0.001 | 100 / 100 / 50 |
| CH₃O\\P—OCH=CCl₂ / CH₃NH (S) (Comparison) | (C) | 0.1 / 0.01 / 0.001 | 100 / 50 / 0 |

EXAMPLE 7 — Tetranychus test (resistant)

Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate so obtained was diluted with water to the desired concentration.

Bean plants (*Phaseolus vulgaris*), which had a height of approximately 10–30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained was expressed as a percentage: 100% means that all the spider mites were killed wherein 0% means that none of the spider mites were killed.

The active compounds, the concentrations of the active compounds, the evaluation times and the results can be seen from the following Table 7.

Table 7

| Active compounds | (Tetranychus test / resistant) | Concentration of active compound in % by weight | Degree of destruction in % after 2 days |
|---|---|---|---|
| CH₃—CH₂—CH₂—O\\P—O—CH=CCl₂ / H₂N (O) (known) | (A) | 0.1 / 0.01 | 60 / 0 |
| CH₃O\\P—O—CH=CCl₂ / H₂N (S) | (1) | 0.1 / 0.01 | 99 / 40 |
| C₂H₅O\\P—O—CH=CCl₂ / H₂N (S) | (2) | 0.1 / 0.01 / 0.001 | 98 / 75 / 35 |
| n-C₃H₇O\\P—O—CH=CCl₂ / H₂N (S) | (3) | 0.1 / 0.01 | 98 / 60 |
| i-C₃H₇O\\P—O—CH=CCl₂ / H₂N (S) | (6) | 0.1 / 0.01 | 98 / 60 |
| n-C₄H₉O\\P—O—CH=CCl₂ / H₂N (S) | (4) | 0.1 / 0.01 / 0.001 | 98 / 85 / 30 |
| i-C₄H₉O\\P—O—CH=CCl₂ / H₂N (S) | (5) | 0.1 / 0.01 | 98 / — |
| CH₃O\\P—OCH=CCl₂ / CH₃NH (S) (Comparison) | (C) | 0.1 / 0.01 | 95 / 0 |

EXAMPLE 8 — Rhopalosiphum test (systemic action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Oat plants (Avena sativa) which have been strongly infested with oat aphids (Rhopalosiphum padi) are watered with the preparation of the active compound so that the preparation penetrates into the soil without wetting the leaves of the oat plants. The active compound is taken up by the oat plants from the soil and thus reaches the infested leaves.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table:

Table 8

(Rhopalosiphum-Test (systemic Action))

| Active compounds | Concentration of active compound in % by weight | Degree of destruction in % after 4 days |
|---|---|---|
| $C_2H_5O$\P—OCH=CCl$_2$ / $CH_3NH$ (Comparison) (C) | 0.1 0.01 | 100 0 |
| $(CH_3)_2CHO$\P—OCH=CCl$_2$ / $H_2N$ (6) | 0.1 0.01 | 100 90 |

EXAMPLE 9

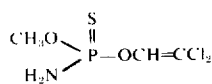
    (1)

36.5 g (1 mole) of gaseous hydrogen chloride were introduced, with stirring, into a solution of 207 g (1 mole) of O-(2,2-dichlorovinyl)-thionophosphoric acid ester diamide (m.p. 62° to 63°C) in 500 ml methanol; the internal temperature of the mixture rose gradually. By external cooling, care was taken that 55°C was not exceeded.

The reaction mixture was stirred for a further hour at 60°C and, after cooling, it was made only just alkaline with a little gaseous ammonia. For decoloration, the mixture was stirred for 10 minutes with about 20 g of activated charcoal, the insoluble portion was filtered off with suction, the solvent was drawn off under reduced pressure, and the residue, dissolved in 500 ml benzene, was washed with 150 ml of water until there was a neutral reaction. After drying over sodium sulfate, the solvent was removed by distillation under reduced pressure. As residue, there was obtained 187 g (84.2% of theory) of O-methyl-O-(2,2-dichlorovinyl)-thionophosphoric acid diester amide as yellowish liquid with the refractive index $n_D^{22} = 1.5322$ and the boiling point 96°C/0.001 mm Hg.

The following compounds of formula (I) in which R has the indicated meanings were prepared by analogous processes:

| Compound | R | Physical properties (refractive index or boiling point) | Yield (% of theory) |
|---|---|---|---|
| 2 | $C_2H_5$— | $n_D^{23} = 1.5240$ b.p. 102°C/0.01 mm Hg | 84.1 |
| 3 | n—$C_3H_7$— | $n_D^{18} = 1.5208$ b.p. 118°C/0.01 mm Hg | 68.1 |
| 4 | n—$C_4H_9$— | $n_D^{22.5} = 1.5097$ | 73.6 |
| 5 | $CH_3$\CH—$CH_2$— / $CH_3$ | $n_D^{20} = 1.5045$ | 78.0 |
| 6 | i—$C_3H_7$— | $n_D^{28} = 1.5124$ b.p. 112°C/0.1 mm Hg | 62.6 |
| 7 | n—$C_7H_{15}$— | $n_D^{20} = 1.5015$ | 81.8 |
| 8 | $CH_3$—$CH_2$—O—$CH_2$—$CH_2$— | $n_D^{23} = 1.5200$ | 68.7 |

It will be appreciated that the instant specification and examples are set forth by way of illustration and not limitation, and that various modifications and changes may be made without departing from the spirit and scope of the present invention.

What is claimed is:

1. A dichlorovinylthionophosphoric acid diester amide of the formula $$Cl_2C=CH-O-P\underset{NH_2}{\overset{S}{\underset{\|}{}}}OR$$

in which
R is alkyl of 1 to 8 carbon atoms or lower alkoxy-lower alkyl.

2. A compound according to claim 1 in which R is alkyl of one to seven carbon atoms or alkoxyalkyl with one to three carbon atoms in each of the alkyl and alkoxy moiety.

3. The compound according to claim 1 wherein such compound is O-methyl-O-(2,2-dichlorovinyl)-thionophosphoric acid diester amide of the formula

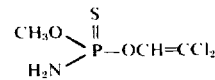

4. The compound according to claim 1 wherein such compound is O-ethyl-O-(2,2-dichlorovinyl)-thionophosphoric acid diester amide of the formula

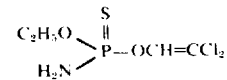

5. The compound according to claim 1 wherein such compound is O-propyl-O-(2,2-dichlorovinyl)-thionophosphoric acid diester amide of the formula

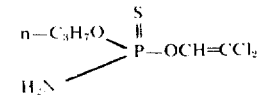

6. The compound according to claim 1 wherein such compound is O-butyl-O-(2,2-dichlorovinyl)-thionophosphoric acid diester amide of the formula

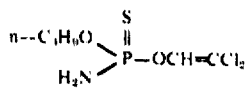

7. The compound according to claim 1 wherein such compound is O-isobutyl-O-(2,2-dichlorovinyl)-thionophosphoric acid diester amide of the formula

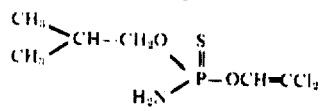

8. The compound according to claim 1 wherein such compound is O-isopropyl-O-(2,2-dichlorovinyl)-thionophosphoric acid diester amide of the formula

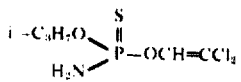

* * * * *